(12) United States Patent
Sakai et al.

(10) Patent No.: US 8,295,604 B2
(45) Date of Patent: Oct. 23, 2012

(54) IMAGE SEARCH METHOD AND DEVICE USING AFFINE-INVARIANT REGIONS

(75) Inventors: Katsuhiro Sakai, Brussels (BE); Ondrej Chum, Celakovice (CZ); Jiri Matas, Roztoky u Prahy (CZ)

(73) Assignees: Toyota Jidosha Kabushiki Kaisha, Toyota-shi (JP); Czech Technical University in Prague, Prague (CZ)

( * ) Notice: Subject to any disclaimer, the term of this patent is extended or adjusted under 35 U.S.C. 154(b) by 1002 days.

(21) Appl. No.: 12/065,445

(22) PCT Filed: Aug. 31, 2006

(86) PCT No.: PCT/JP2006/317688
§ 371 (c)(1),
(2), (4) Date: Feb. 29, 2008

(87) PCT Pub. No.: WO2007/026948
PCT Pub. Date: Mar. 8, 2007

(65) Prior Publication Data
US 2009/0290798 A1 Nov. 26, 2009

(30) Foreign Application Priority Data
Aug. 31, 2005 (JP) .................. 2005-251726

(51) Int. Cl.
G06K 9/46 (2006.01)
G06K 9/00 (2006.01)
G06K 9/62 (2006.01)
G06K 9/36 (2006.01)
G09G 5/00 (2006.01)

(52) U.S. Cl. ........ 382/195; 382/103; 382/154; 382/215; 382/276; 345/648

(58) Field of Classification Search .................. 382/203, 382/195, 276, 154, 103, 215; 345/648
See application file for complete search history.

(56) References Cited

FOREIGN PATENT DOCUMENTS
JP 11 203461 7/1999
JP 11 312248 11/1999
JP 11 328417 11/1999

OTHER PUBLICATIONS

Hu, Ming-Kuei, Visual Pattern Recognition by Moment Invariants, 1962, IRE Transactions on Information Theory,pp. 179-187.*
Mikolajczyk et al, An affine invariant interest point detector, 2002, Proceedings of the 7th European COnference in COmputer Vision, pp. 1-15.*

(Continued)

Primary Examiner — Kathleen Y Dulaney
(74) Attorney, Agent, or Firm — Oblon, Spivak, McClelland, Maier & Neustadt, L.L.P.

(57) ABSTRACT

An image search method that is robust and fast (with computational complexity of logarithmic order relative to the number of models). The image search method including: extracting a plurality of specific regions possessing such a property that a shape can be normalized regardless of an affine transformation thereof, as affine-invariant regions from one or more learning images; calculating, with respect to a reference affine-invariant region, other neighboring affine-invariant regions as a set; deforming the neighboring affine-invariant regions by a transformation to normalize the shape of the reference affine-invariant region; and outputting the deformed shapes of the neighboring affine-invariant regions, together with combination of the reference affine-invariant region and the neighboring affine-invariant regions.

9 Claims, 6 Drawing Sheets

OTHER PUBLICATIONS

Wells III, William M. et al., "Mult-Modal Volume Registration by Maximization of Mutual Information", Medical Image Analysis, vol. 1, No. 1, pp. 35-51(1996).

Lowe, David G., "Distinctive Image Features From Scale-Invariant Keypoints", International Journal of Computer Vision, pp. 1-28 (2004).

Matas, J et al., "Robust Wide Baseline Stereo From Maximally Stable Extremal Regions", BMVC, pp. 384-393 (2002).

Luc, Van Gool, et al., "Local Features for Image Retrieval", In : State-of-the-Art in Content-Based Image and Video Retrieval, Kluwer Academic Publishers, XP007908903, 2001, pp. 21-41.

* cited by examiner

IMAGE SEARCH METHOD AND DEVICE USING AFFINE-INVARIANT REGIONS

FIELD OF THE INVENTION

The present invention relates to an image search method and apparatus capable of performing a reliable image search even in an image with changing brightness or the like.

BACKGROUND OF THE INVENTION

Calculation of small regions in correspondence relationship between a plurality of images is a significant issue for various image processing applications such as object recognition, 3D information reconstruction, and image searching. An image recognition means configured to extract local regions in images in a normalized state invariant to affine transformation and rotation transformation (which will be referred to hereinafter as affine-invariant regions) and to use correspondence relationship between the affine-invariant regions has the advantage that a change of a viewpoint relative to a recognition object can be geometrically modeled. Since it utilizes the local affine-invariant regions, it also has the advantage of high adaptability for partial hiding of the recognition object.

[Non-patent Document 1] W. M. Wells, P. Viola, H. Atsumi, S. Nakajima, and R. Kikins, "Multi-Modal Volume Registration Maximization of Mutual Information" Medical Image Analysis, 1996

[Non-patent Document 2] D. G. Lowe "Distinctive image features from scale-invariant keypoints" Int. J. Compt. Vision, 60(2): 91-110, 2004

[Non-patent Document 3] J. Mates, O. Chum, M. Urban, and T. Pajdla "Robust Wide Baseline Stereo from Extremal Regions" BMVC02, 2002

These techniques are generally implemented by the following three-step processing (cf. FIG. 6). (1) To extract affine-invariant regions from one or more model images and a search object image (sample image). (2) To calculate correspondences of the extracted affine-invariant regions on the basis of local information. (3) To examine the correspondences calculated in the above step (2), using global information.

SUMMARY OF THE INVENTION

Robustness and execution speed are also significant issues herein in the calculation of correspondences between the affine-invariant regions in the above step (2). For example, where a plurality of objects are recognized, and when a method adopted is to sequentially compare coincidence between affine-invariant regions extracted from a plurality of model images and affine-invariant regions extracted from a search object image, the computational load also linearly increases with increase in the number of model images (i.e., the number of affine-invariant regions extracted therefrom), and it is fatal to real-time applications. Therefore, an object of the present invention is to provide an image search method and apparatus being robust and fast (with computational complexity of logarithmic order relative to the number of models).

The aforementioned [Non-patent Document 1] proposes the correspondence search robust even to light intensity change being not a monotonic function, by calculating similarity between two images using mutual information as an index. When this technique is applied to the correspondence search between affine-invariant regions, it is necessary to calculate the similarity for all combinations of affine-invariant regions, and the computational load increases with the number of affine-invariant regions.

An image search method in one aspect includes: an extraction step of extracting a plurality of specific regions possessing such a property that a shape can be normalized regardless of an affine transformation thereof, as affine-invariant regions from one or more learning images; a calculation step of calculating, with respect to a reference affine-invariant region, other neighboring affine-invariant regions as a set; a deformation step of deforming the neighboring affine-invariant regions by a transformation to normalize the shape of the reference affine-invariant region; and an output step of outputting the deformed shapes of the neighboring affine-invariant regions, together with a combination of the reference affine-invariant region and the neighboring affine-invariant regions.

The affine-invariant regions may be set as local coordinate systems.

The image search method may further include: an input step of inputting an object image as a search object; an object deformation step of extracting a plurality of specific regions possessing such a property that a shape can be normalized regardless of an affine transformation thereof, as affine-invariant regions from the object image, calculating, with respect to a reference affine-invariant region, other neighboring affine-invariant regions as a set, and deforming the neighboring affine-invariant regions by a transformation to normalize the shape of the reference affine-invariant region; and a search step of finding correspondence between the affine-invariant regions extracted from the learning images and the affine-invariant regions extracted from the object image, based on a combination of the reference affine-invariant region and the neighboring affine-invariant regions in the object image, the deformed shapes of the neighboring affine-invariant regions, and an output result outputting by the output step.

An image search apparatus in one aspect includes: extraction means for extracting a plurality of specific regions possessing such a property that a shape can be normalized regardless of an affine transformation thereof, as affine-invariant regions from one or more learning images; calculation means for calculating, with respect to a reference affine-invariant region, other neighboring affine-invariant regions as a set; deformation means for deforming the neighboring affine-invariant regions by a transformation to normalize the shape of the reference affine-invariant region; and output means for outputting the deformed shapes of the neighboring affine-invariant regions, together with a combination of the reference affine-invariant region and the neighboring affine-invariant regions.

The affine-invariant regions may be set as local coordinate systems.

The image search apparatus may further include: input means for inputting an object image as a search object; object deformation means for extracting a plurality of specific regions possessing such a property that a shape can be normalized regardless of an affine transformation thereof, as affine-invariant regions from the object image, calculating, with respect to a reference affine-invariant region, other neighboring affine-invariant regions as a set, and deforming the neighboring affine-invariant regions by a transformation to normalize the shape of the reference affine-invariant region; and search means for finding correspondence between the affine-invariant regions extracted from the learning image sand the affine-invariant regions extracted from the object image, based on a combination of the reference affine-invariant region and the neighboring affine-invariant regions in the object image, the deformed shapes of the neighboring affine-invariant regions, and an output result outputted by the output means.

DESCRIPTION OF THE PREFERRED EMBODIMENTS

Figure 1:
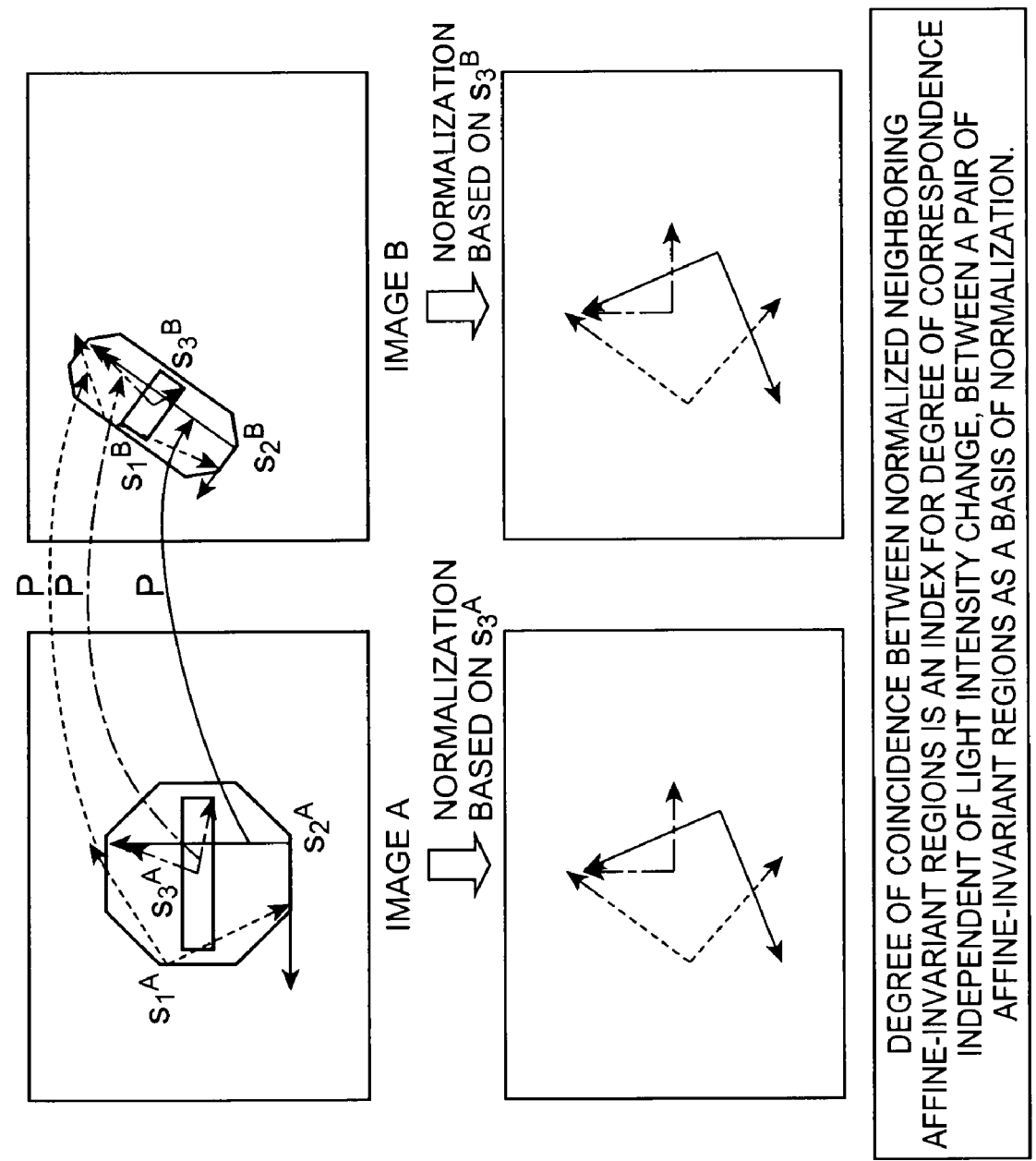
FIG. 1 is an explanatory drawing showing a schematic process of learning in an image search method and apparatus of the present invention.

An image search apparatus of the present invention has an input unit for inputting an object image as a search object and learning images to be used as a database for comparison with the object image; a calculation unit for carrying out calculation to determine an affine-invariant region and others for an input image, and comparison for a search; an output unit for outputting a constructed database or search result; a memory unit for storing programs necessary for the calculation, intermediate calculation result, the constructed database, etc.; and so on.

The input unit can be a camera, a scanner, or an input/output drive for inputting an image as data. The calculation unit can be a CPU or GPU•ROM•RAM, or the like. The output unit can be a monitor display, a printer, or an input/output drive. The memory unit can be a hard disk, a RAM, or one of other storage devices.

An outline of an image search method (database construction method) in the present embodiment will be described. With vehicles of the same kind but different colors, the taillights of a white vehicle appear darker relative to the body color, whereas the taillights of a black vehicle appear brighter relative to the body color. Windows look darker in the daytime than the other portions of buildings, whereas they look brighter in the night by virtue of influence of electric lights. For recognition of such objects, it is necessary to calculate correspondences between objects with their optical attribute varying nonmonotonically. The present embodiment uses local coordinate systems defined by affine-invariant regions, as indices to implement a correspondence search fast and robust even to nonmonotonic light intensity change. The concept as a base of the present invention will be explained below.

Let us define a set of affine-invariant regions extracted from image A, as $S^A = \{s_1^A, s_2^A, \ldots, s_N^A\}$. It is assumed herein that each affine-invariant region is uniquely expressed by an affine transformation matrix and is defined as a local coordinate system on an image. In the subsequent formula computation, $s_i^A$ is treated as an affine transformation matrix. An expression using an affine transformation matrix is an index for geometric transformation and does not explicitly contain optical characteristics. Therefore, as long as the extraction of affine-invariant region itself is not affected by light intensity change, the affine transformation matrix is not affected by light intensity change, either. The extraction of affine-invariant region free of influence of light intensity change can be implemented, for example, by handling MSER+ (region brighter than the surroundings) and MSER− (region darker than the surroundings) with no distinction in [Non-patent Document 3] described above. It is assumed hereinafter that affine-invariant regions as objects of discussion are extracted in the form free of influence of light intensity change.

Let us define a set of affine-transformed regions extracted similarly from image B taken from another viewpoint for the same object as the image A, as $S^B = \{s_1^B, s_2^B, \ldots, s_N^B\}$. For simplicity, $s_i^B$ and $s_i^A$ are assumed to be corresponding affine-invariant regions, for all i satisfying $1 \leq i \leq N$. Furthermore, the object is assumed to be a planar object, and an affine transformation matrix from the object in image A to the object in image B is defined as P. In this case, it is apparent that the following equation holds for all i satisfying $1 \leq i \leq N$.

$$s_i^B = P s_i^A$$

Therefore, the following relation holds for all combinations of i and j satisfying $1 \leq i \leq N$ and $1 \leq j \leq N$.

$$(s_j^B)^{-1} s_i^B = (P s_j^A)^{-1} P s_i^A = (s_j^A)^{-1} P^{-1} P s_i^A = (s_j^A)^{-1} s_i^A$$

Namely, $s_i^A$ geometrically normalized on the basis of affine-invariant region $s_j^A$ coincides with $s_i^B$ normalized on the basis of $s_j^B$ (cf. FIG. 1). In other words, a coincidence degree between images of coordinate systems of normalized neighboring affine-invariant regions (surrounding affine-invariant regions) can be used as an index for evaluation of a correspondence degree between affine-invariant regions used as the bases of normalization. For example, when coordinate systems of a pair of surrounding affine-invariant regions coincide, a vote is cast for a correspondence of an affine-invariant region pair as a basis of normalization (possibly, for a correspondence between the coincident surrounding affine-invariant regions), and, for example, correspondences can be determined from final numbers of votes. The above discussion was based on the limitation of the object to the planar object, but any other object can also be regarded as an approximate plane with focus on a local region; therefore, the above discussion can also apply thereto as it is. Furthermore, by discretizing the coordinate systems of the normalized affine-invariant regions, it is feasible to implement a fast correspondence search with the computational complexity of O(log N) (N: the number of affine-invariant regions) while applying the principle of database search.

An embodiment will be described below. An implementation method of the present invention will be explained below using an example to calculate correspondences between a plurality of affine-invariant regions extracted from a set $A = \{a_1, a_2, \ldots, a_N\}$ including one or more images, and a plurality of affine-invariant regions extracted from an image b. Each image a $\{1 \leq i \leq N\}$ in set A corresponds to each model as a recognition object in an example of object recognition. A correspondence search between stereo images can be regarded as a special case with N=1 of the object recognition, and the fundamental processing flow is the same as in the object recognition. According to the practice in the object recognition, to extract affine-invariant regions from set A and describe them in the form enabling an efficient correspondence search will be called learning, and to extract affine-invariant features from image b and calculate affine-invariant features extracted from corresponding set A will be called recognition.

Figure 2:
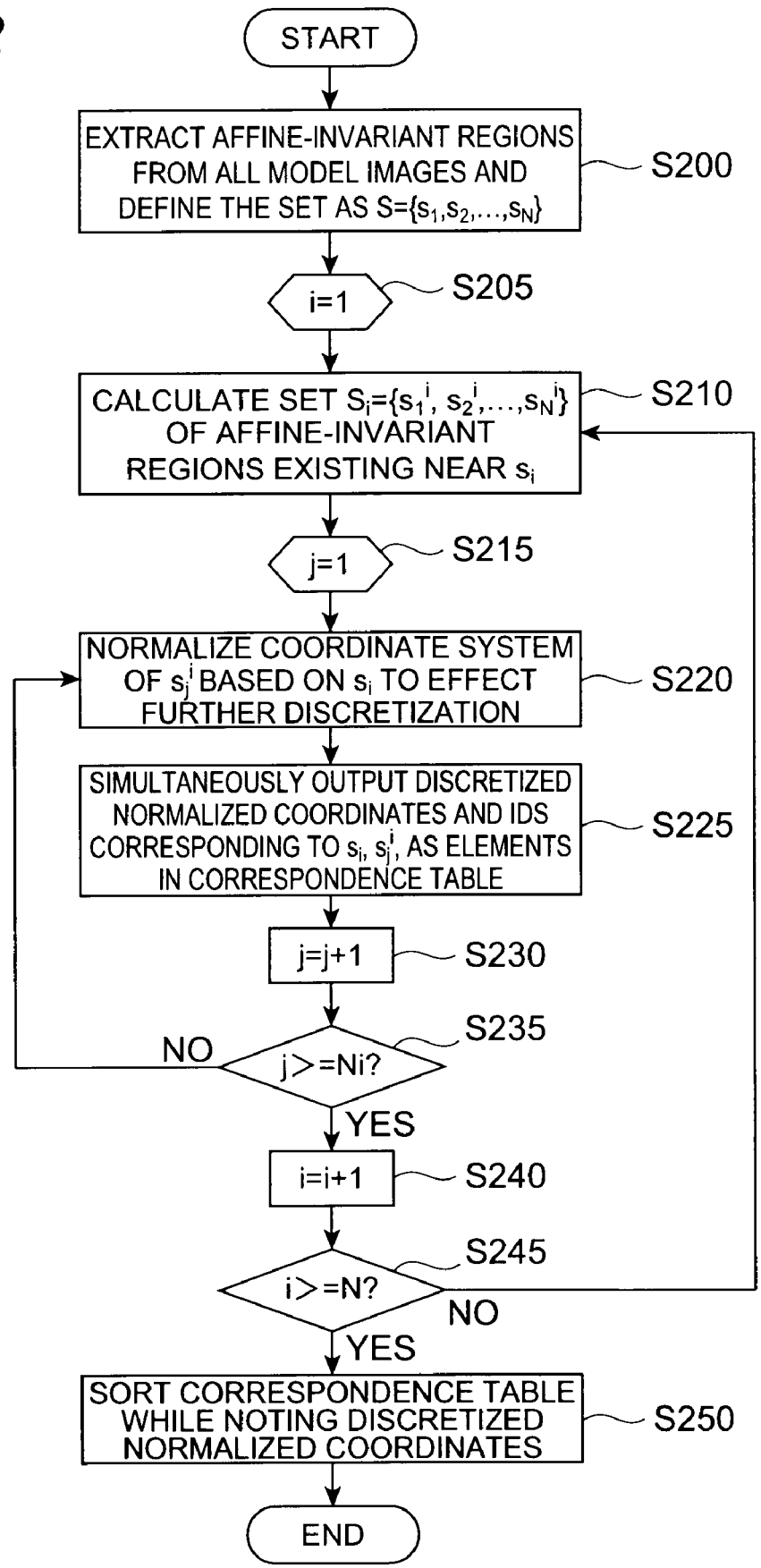
FIG. 2 is a flowchart showing a flow of learning in the image search method and apparatus of the present invention.

In the example of recognition of multiple objects, a change in computational complexity is important for the number N of models. Since the number of affine-invariant regions extracted from set A is proportional to the number of models, a change in computational complexity for it is important. If the image size is constant, the number of affine-invariant regions extracted from image b can be regarded as almost constant in the object recognition and poses no problem. A procedure in learning will be described below with reference to the flowchart of FIG. 2.

Step 200 is to extract a plurality of affine-invariant regions from each image in set $A=\{a_1, a_2, \ldots, a_N\}$ and extract affine transformation matrices as geometric features independent of light intensity change. Since the present invention comprises performing the subsequent processing for affine transformation matrices, it is guaranteed that the entire processing is free of influence of light intensity change as long as this matrix extraction step is implemented in the form free of the influence of light intensity change. The extraction of affine-invariant regions independent of light intensity change can be implemented by handling MSER+ (region brighter than the surroundings in qualitative representation) and MSER− (region darker than the surroundings in the same representation) with no distinction in the example of [Non-patent Document 3] described above. The set of affine-invariant regions (transformation matrices) calculated herein is defined as $S=\{s_1, s_2, \ldots, s_N\}$.

Step 205 is to initialize i to 1 where $1 \leq i \leq N$. Next, step 210 is to calculate a set of affine-invariant regions near $s_i$ in the images, $S^i=\{s_1^i, s_2^i, \ldots, s_N^i\}$. Step 215 is to initialize j first to 1 where $1 \leq j \leq N$. When $d_{s_i}^{s_j}$ is defined as a distance between an origin of an $s_i$ coordinate system resulting from geometric transformation of sj by transformation matrix $s_j^{-1}$ to geometrically normalize $s_i$, and an origin of $s_j$, $d_{s_i}^{s_j}$ is obtained by the following equation.

$$d_{s_i}^{s_j} = \sqrt{x^2+y^2}$$ [Mathematical Expression 1]

In this equation, x and y satisfy the following equation.

$$t\begin{bmatrix}x\\y\\1\end{bmatrix} = s_i^{-1} s_j \begin{bmatrix}0\\0\\1\end{bmatrix}$$ [Mathematical Expression 2]

Figure 3:
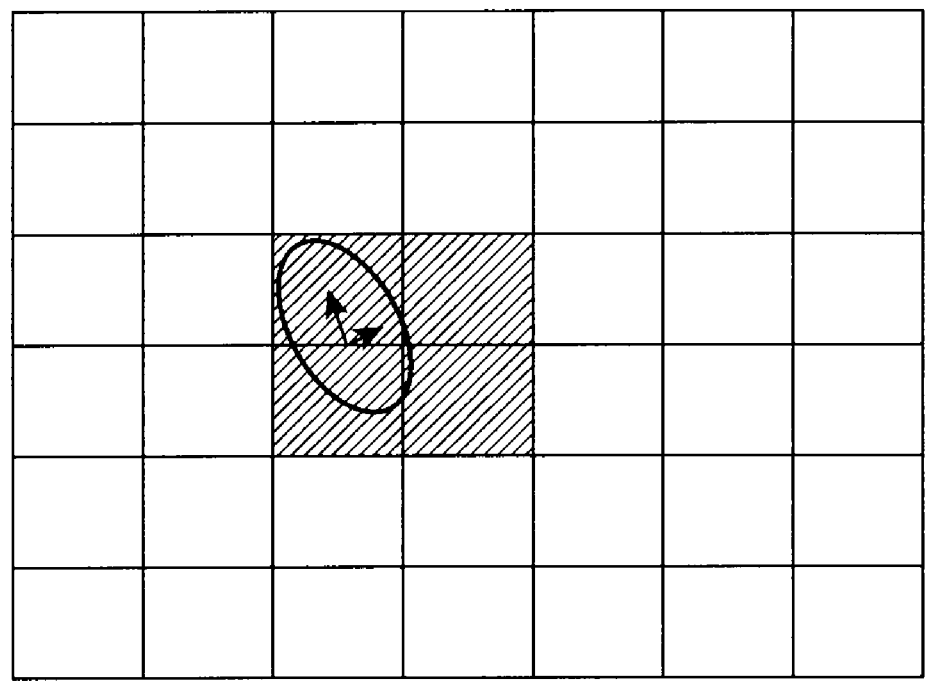
FIG. 3 is an explanatory drawing schematically showing a limitation of a neighborhood search region using subregions.

$S^i$ is a set of affine-invariant regions sj the distance $d_{s_i}^{s_j}$ of which to $s_i$ is not more than a threshold, and can generally be calculated by computing the distance $d_{s_i}^{s_i}$ with all $s_j$ extracted from the same image $a_k$ as $s_i$. The computational load of this processing is $O(NP^2)$ using the number P of affine-invariant regions extracted from the same image. In the object recognition this step is carried out off-line (learning stage) and the computational load is not a significant problem. In a stereo correspondence search (N=1), this step is processed online and is an object of evaluation of computational complexity, but the computational load is O(1) and poses no problem because P can be regarded as constant as long as images of fixed size are handled. This processing can be further efficiently computed by dividing an image into a plurality of subregions and limiting a search region of sj for the distance $d_{s_i}^{s_j}$ to be calculated, to some subregions around $s_i$, as shown in FIG. 3. The number of neighboring affine-invariant regions for each $s_i$ can be regarded as a constant by controlling the threshold of the distance $d_{s_i}^{-1}$. Conversely, the extraction of neighboring affine-invariant regions by the constant number is to extract clues necessary for correspondence point search by the constant number, and is thus rational supposition.

Figure 4:
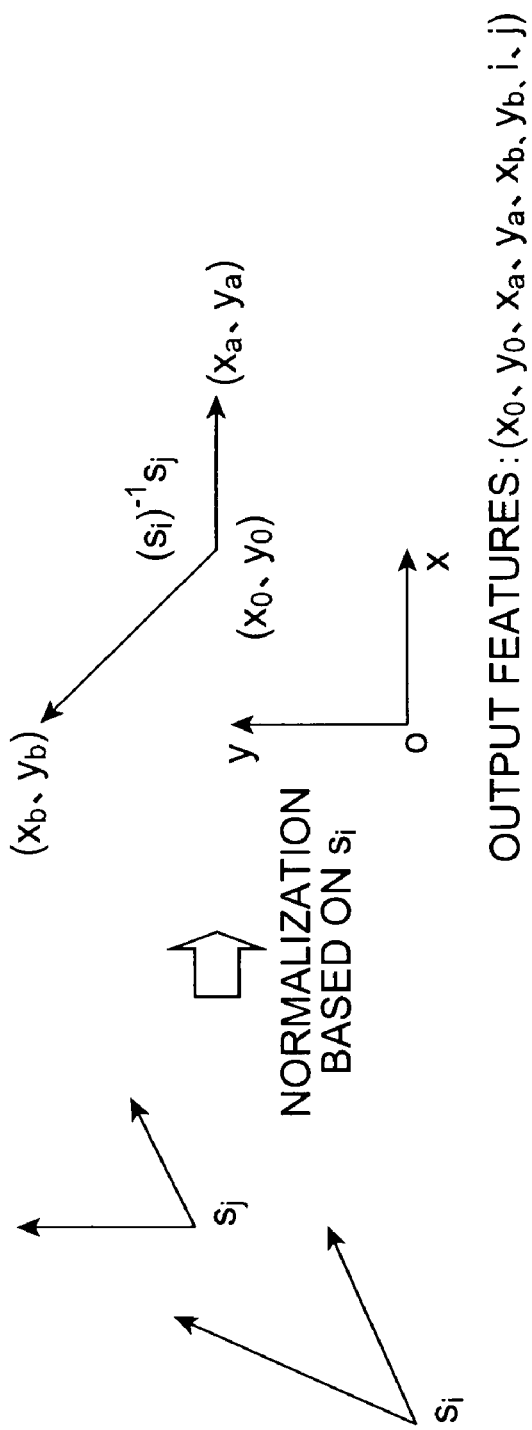
FIG. 4 is an explanatory drawing showing feature quantities outputted to a correspondence table (discretized table).

Step 220 is to transform $s_j$ by transformation matrix $s_i^{-1}$ to geometrically normalize $s_i$, as shown in FIG. 4. Step 225 is to simultaneously output a discretized coordinate system of $s_i$, $s_i^{-1}$ and i, j to a learning table as shown in [Table 1] below. [Table 1] shows an example in which the table is created by directly using x-y coordinates of three points in the coordinate system spanned by $s_i$, $s_i^{-1}$, and the scope of application is not limited to it; the processing can be performed with various coordinate systems such as polar coordinates.

TABLE 1

| $x_0$ | $y_0$ | $x_a$ | $y_a$ | $x_b$ | $y_b$ | i | j |
|---|---|---|---|---|---|---|---|
| −5 | −5 | 4 | 3 | 3 | −2 | 109 | 214 |
| −5 | −5 | 4 | 3 | 3 | 4 | 48 | 241 |
| −5 | −5 | 4 | 3 | 3 | 5 | 89 | 289 |
| −5 | −5 | 4 | 3 | 4 | −1 | 456 | 13 |
| −5 | −5 | 4 | 3 | 4 | 1 | 12 | 345 |
| −5 | −5 | 4 | 3 | 4 | 2 | 847 | 645 |
| −5 | −5 | 4 | 3 | 4 | 5 | 748 | 23 |
| 5 | 5 | 5 | 5 | 5 | 4 | 244 | 23 |
| 5 | 5 | 5 | 4 | 4 | 5 | 37 | 424 |

Steps 230, 235 are to sequentially increment j with i fixed, and repeat steps 220, 225. Steps 240, 245 are to increment i and repeat steps 210-235. During this repetition the processing is performed while j is sequentially incremented with i=i+1.

Step 250 is to sort the rows in the learning table in a certain order on the basis of the coordinate values except for i and j. For example, a sorting standard can be the following strategy: $x_0$ is given the highest priority, $y_0$ the second highest priority, ..., $y_b$ the lowest priority; comparison is started from the highest; and if superordinate values are identical, subordinate values are compared. It is also possible to select any evaluation standard that can determine a unique order. One of the existing techniques such as quick sort can be used for the sorting. The sorted learning table created in this step is the final learning result.

Figure 5:
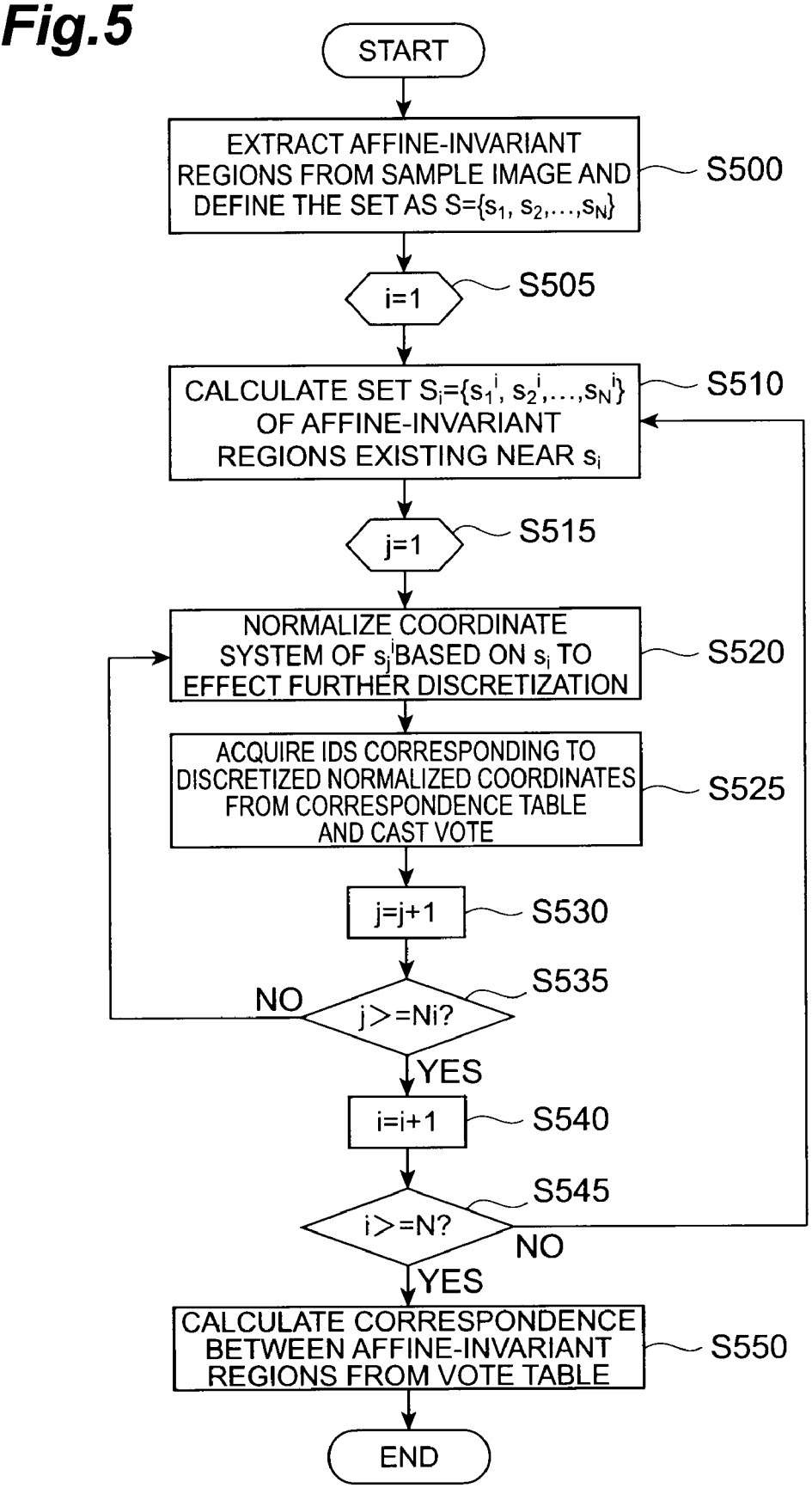
FIG. 5 is a flowchart showing a flow of recognition (search) in the image search method and apparatus of the present invention.
Figure 6:
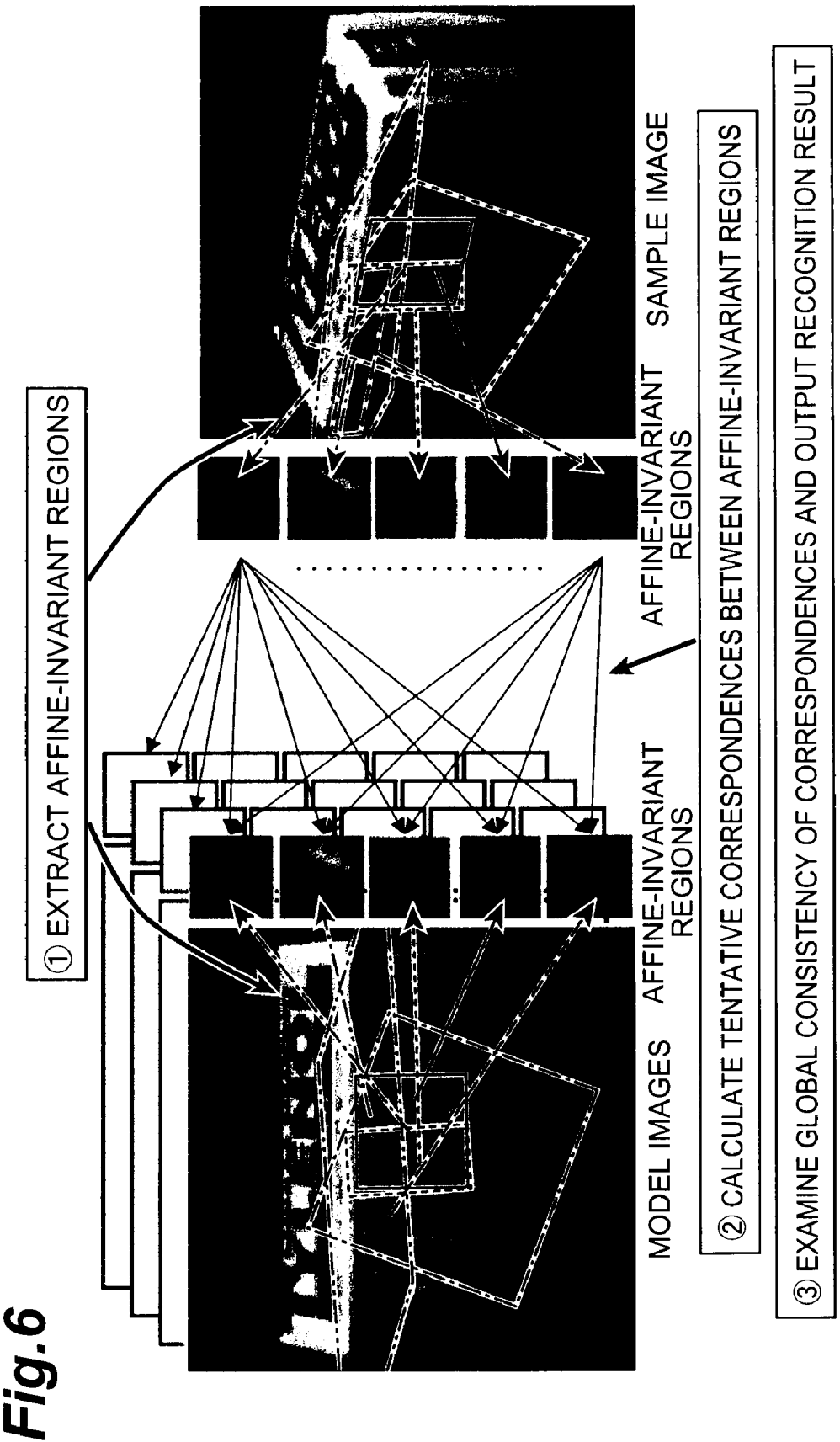
FIG. 6 is an explanatory drawing showing a state in which local regions in images are extracted in a normalized state to affine transformation and rotation transformation.

The processing during recognition will be described below with focus on portions different from the processing in the learning, with reference to the flowchart of FIG. 5. Steps 500-520 are processes equivalent to steps 200-220 in the flowchart of FIG. 2 and the computational complexity of these processes is independent of the number N of recognition objects.

Step 525 is to select an entry with a match of the discretized $s_i^{-1} s_j$ coordinate system from the learning table, with respect to the affine-invariant region extracted from image b. This processing can be implemented by a simple search technique and in the computational complexity of O(log N). This supports a match between the affine-invariant region i extracted from image b, and an affine-invariant region with ID of item i (column) of the learning table entry (row) matched among the affine-invariant regions extracted from the image set A. Therefore, a vote table as shown in [Table 2] below is created and a vote is cast for the match of these.

TABLE 2

| | | IDS OF AFFINE-INVARIANT REGIONS EXTRACTED FROM SET A (MODEL IMAGE GROUP) | | | | | |
|---|---|---|---|---|---|---|---|
| | | 1 | 2 | 3 | 4 | ... ... | P |
| IDS OF AFFINE-INVARIANT REGIONS EXTRACTED FROM IMAGE b | 1 | 12 | 0 | 0 | 6 | | 2 |
| | 2 | 1 | 0 | 2 | 4 | | 18 |
| | 3 | 0 | 0 | 0 | 0 | | 3 |
| | ... | | | | | | |

TABLE 2-continued

| | IDS OF AFFINE-INVARIANT REGIONS EXTRACTED FROM SET A (MODEL IMAGE GROUP) | | | | | |
|---|---|---|---|---|---|---|
| | 1 | 2 | 3 | 4 | ...... | P |
| ... | | | | | | |
| ... | | | | | | |
| ... | | | | | | |
| ... | | | | | | |
| ... | | | | | | |
| ... | | | | | | |
| ... | | | | | | |
| ... | | | | | | |
| Q | 0 | 0 | 3 | 0 | | 4 |

Since a match of an entry also similarly supports a match between the affine-invariant region j extracted from image b, and an affine-invariant region with ID of item j (column) of the learning table entry (row) matched among the affine-invariant regions extracted from the image set A, it is also possible to cast a vote for the match of these. Steps 530, 535 are to sequentially increment j with i fixed, and repeat steps 520, 525. Steps 540, 545 are to increment i and repeat steps 510-535. During this repetition the processing is performed while j is sequentially incremented with i=i+1.

Step 550 is to calculate correspondences between the affine-invariant regions extracted from set A and the affine-invariant regions extracted from image b, by making use of the created vote table. On that occasion, the correspondence calculation can be implemented with various indices based on desired properties for applications, e.g., the highest vote in each row, or the number of votes not less than a threshold. A technique of examining all the entries in the vote table after the voting increases the computational complexity in proportion to the number N of affine-invariant regions extracted from set A (the number of models in object recognition). However, efficient computation independent of the number of models can be implemented by such a device that ID with the highest number of votes in each row (column) is sequentially updated and stored during the creation of the vote table.

INDUSTRIAL APPLICABILITY

The image search method or image search apparatus of the present invention involves classifying the deformed shapes of neighboring affine-invariant regions, together with combination of the reference affine-invariant region and the neighboring affine-invariant regions, and is thus able thereby to construct the image database permitting the robust and fast search. When the object image as a search object is provided, the foregoing database is used to perform the robust and fast search, using the deformed shapes of neighboring affine-invariant regions, together with combination of the reference affine-invariant region and the neighboring affine-invariant regions in the object image.

The invention claimed is:

1. An image search method implemented by an image searching apparatus having a processor, comprising:
   extracting a plurality of affine-invariant regions from one or more learning images, the affine-invariant regions being regions in which normalization of a shape is obtainable regardless of an affine transformation thereof;
   identifying, using the image searching apparatus and with respect to a reference affine-invariant region s, neighboring affine-invariant regions as a set;
   deforming, using the image searching apparatus, the neighboring affine-invariant regions by a transformation matrix $s^{-1}$, the deforming geometrically normalizing a shape of the reference affine-invariant region s; and
   outputting deformed shapes of the neighboring affine-invariant regions, together with a combination of the reference affine-invariant region s and the neighboring affine-invariant regions.

2. The image search method according to claim 1, wherein the affine-invariant regions are set as local coordinate systems.

3. The image search method according to claim 1, further comprising:
   inputting an object image as a search object;
   second affine-invariant regions from the object image, identifying, with respect to a reference second affine-invariant region, neighboring second affine-invariant regions as a set, and deforming the neighboring second affine-invariant regions by a transformation, the deforming normalizing a shape of the reference second affine-invariant region; and
   finding correspondence between the affine-invariant regions extracted from the learning images and the second affine-invariant regions extracted from the object image, based on a combination of the reference second affine-invariant region and the neighboring second affine-invariant regions in the object image, deformed shapes of the neighboring second affine-invariant regions, and an output result outputted by the outputting.

4. An image search apparatus comprising:
   extraction means for extracting a plurality of affine-invariant regions from one or more learning images, the affine-invariant regions being regions in which normalization of a shape is obtainable regardless of an affine transformation thereof;
   calculation means for identifying, with respect to a reference affine-invariant region s, neighboring affine-invariant regions as a set;
   deformation means for deforming the neighboring affine-invariant regions by a transformation matrix $s^{-1}$, the deforming geometrically normalizing a shape of the reference affine-invariant region s; and
   output means for outputting deformed shapes of the neighboring affine-invariant regions, together with a combination of the reference affine-invariant region s and the neighboring affine-invariant regions.

5. The image search apparatus according to claim 4, wherein the affine-invariant regions are set as local coordinate systems.

6. The image search apparatus according to claim 4, further comprising:
   input means for inputting an object image as a search object;
   object deformation means for extracting a plurality of second affine-invariant regions from the object image, identifying, with respect to a reference second affine-invariant region, neighboring second affine-invariant regions as a set, and deforming the neighboring second affine-invariant regions by a transformation, the deforming normalizing a shape of the reference second affine-invariant region; and
   search means for finding correspondence between the affine-invariant regions extracted from the learning images and the second affine-invariant regions extracted from the object image, based on a combination of the reference second affine-invariant region and the neighboring second affine-invariant regions in the object image, deformed shapes of the neighboring second affine-invariant regions, and an output result outputted by the output means.

7. An image search apparatus comprising:
an extraction unit configured to extract a plurality of affine-invariant regions from one or more learning images, the affine-invariant regions being regions in which normalization of a shape is obtainable regardless of an affine transformation thereof;
a calculation unit configured to identify, with respect to a reference affine-invariant region s, neighboring affine-invariant regions as a set;
a deformation unit configured to deform the neighboring affine-invariant regions by a transformation matrix $s^{-1}$, the deforming geometrically normalizing a shape of the reference affine-invariant region s; and
an output unit configured to output deformed shapes of the neighboring affine-invariant regions, together with a combination of the reference affine-invariant region s and the neighboring affine-invariant regions.

8. The image search apparatus according to claim 7, wherein the affine-invariant regions are set as local coordinate systems.

9. The image search apparatus according to claim 7, further comprising:
an input unit configured to input an object image as a search object;
an object deformation unit configured to extract a plurality of second affine-invariant regions from the object image, to identify, with respect to a reference second affine-invariant region, neighboring second affine-invariant regions as a set, and to deform the neighboring second affine-invariant regions by a transformation, the deforming normalizing a shape of the reference second affine-invariant region; and
a search unit configured to find correspondence between the affine-invariant regions extracted from the learning images and the second affine-invariant regions extracted from the object image, based on a combination of the reference second affine-invariant region and the neighboring second affine-invariant regions in the object image, deformed shapes of the neighboring second affine-invariant regions, and an output result output by the output unit.

* * * * *